US009892540B2

(12) United States Patent
Nair et al.

(10) Patent No.: US 9,892,540 B2
(45) Date of Patent: *Feb. 13, 2018

(54) IMAGE-BASED DEFORMATION OF SIMULATED CHARACTERS OF VARIED TOPOLOGY (71) Applicant: ELECTRONIC ARTS INC., Redwood City, CA (US)

(72) Inventors: Srikumar Nair, Palo Alto, CA (US); Igor Borovikov, Foster City, CA (US); Kenneth Tan Kok Yoong, San Mateo, CA (US)

(73) Assignee: ELECTRONIC ARTS INC., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/452,244

(22) Filed: Mar. 7, 2017

(65) Prior Publication Data
US 2017/0178381 A1 Jun. 22, 2017

Related U.S. Application Data (63) Continuation of application No. 14/598,057, filed on Jan. 15, 2015, now Pat. No. 9,626,808.
(Continued)

(51) Int. Cl.
G06T 13/40 (2011.01)
G06T 15/04 (2011.01)
(Continued)

(52) U.S. Cl.
CPC .............. G06T 13/40 (2013.01); A63F 13/53 (2014.09); A63F 13/56 (2014.09); G06T 15/04 (2013.01);
(Continued)

(58) Field of Classification Search
None
See application file for complete search history.

(56) References Cited

U.S. PATENT DOCUMENTS 6,037,948 A * 3/2000 Liepa ................... G06T 11/001
345/582
6,072,496 A * 6/2000 Guenter ............. G06K 9/00201
345/419
(Continued)

OTHER PUBLICATIONS

Joshi et al. "Learning Controls for Blend Shape Based Realistic Facial Animation", 2003.*
(Continued)

Primary Examiner — Hilina K Demeter
(74) Attorney, Agent, or Firm — Lowenstein Sandler LLP (57) ABSTRACT A graphical asset associated with a simulated character of a video game is received. A first image and a second image associated with the simulated character are subsequently received, the first image comprising graphical displacement mapping information for a first topology of image deformation and the second image comprising graphical displacement mapping information for a second topology of deformation. A portion of the graphical asset is then deformed using the graphical displacement mapping information from the first image and the second image to change the 3D geometry of the portion of the graphical asset.

20 Claims, 8 Drawing Sheets

Related U.S. Application Data (60) Provisional application No. 62/032,179, filed on Aug. 1, 2014.

(51) Int. Cl.
  *G06T 17/20* (2006.01)
  *G06T 19/20* (2011.01)
  *A63F 13/53* (2014.01)
  *A63F 13/56* (2014.01)

(52) U.S. Cl.
  CPC ............ *G06T 17/205* (2013.01); *G06T 19/20* (2013.01); *A63F 2300/65* (2013.01); *A63F 2300/6607* (2013.01); *G06T 2219/2021* (2013.01)

(56) References Cited

U.S. PATENT DOCUMENTS

| | | | | |
|---|---|---|---|---|
| 8,115,774 B2* | 2/2012 | Biehn | | G06T 13/40 345/473 |
| 8,154,544 B1* | 4/2012 | Cameron | | G06T 19/20 345/419 |
| 8,269,778 B1* | 9/2012 | Baraff | | G06T 13/20 345/156 |
| 8,681,147 B1* | 3/2014 | Baraff | | G06T 19/20 345/419 |
| 9,001,118 B2* | 4/2015 | Molyneaux | | G06T 7/0032 345/419 |
| 2003/0038800 A1* | 2/2003 | Kawahara | | A63F 13/10 345/420 |
| 2006/0125830 A1* | 6/2006 | Piponi | | G06T 13/20 345/473 |
| 2007/0024632 A1* | 2/2007 | Couture-Gagnon | | G06T 17/20 345/581 |
| 2007/0189591 A1* | 8/2007 | Lu | | A61N 5/103 382/128 |
| 2007/0206016 A1* | 9/2007 | Szymanski | | G06T 13/20 345/473 |
| 2007/0206023 A1* | 9/2007 | Street | | A63F 13/10 345/582 |
| 2008/0225044 A1* | 9/2008 | Huang | | G06T 17/00 345/420 |
| 2010/0091018 A1* | 4/2010 | Tatarchuk | | G06T 13/20 345/423 |
| 2011/0084970 A1* | 4/2011 | Tonnesen | | G06T 13/40 345/473 |
| 2012/0086783 A1* | 4/2012 | Sareen | | G06N 3/006 348/47 |
| 2012/0185218 A1* | 7/2012 | Bickel | | G06T 19/20 703/1 |
| 2012/0281019 A1* | 11/2012 | Tamstorf | | G06T 3/0093 345/646 |
| 2013/0215116 A1* | 8/2013 | Siddique | | G06Q 30/0643 345/420 |
| 2014/0198108 A1* | 7/2014 | Sigal | | G06T 13/40 345/474 |
| 2014/0267306 A1* | 9/2014 | Koniaris | | G06T 13/20 345/473 |
| 2014/0333614 A1* | 11/2014 | Black | | G06F 17/5009 345/419 |
| 2016/0028950 A1* | 1/2016 | Perazzi | | H04N 5/23238 348/38 |

OTHER PUBLICATIONS

No Author, "Displacement Mapping," Wikipedia, The Free Encyclopedia, [retrieved Jan. 14, 2015], 3 pages, Internet: <http://en.wikipedia.org/w/index.php?title=Displacement_mapping&printable=yes>.

Ma et al., "Facial Performance Synthesis using Deformation-Driven Polynomial Displacement Maps", 2008.

Joshi et al., "Learning Controls for Blend Shape Based Realistic Facial Animation", 2003.

\* cited by examiner

IMAGE-BASED DEFORMATION OF SIMULATED CHARACTERS OF VARIED TOPOLOGY

RELATED APPLICATIONS

This application is a continuation of U.S. patent application Ser. No. 14/598,057, filed Jan. 15, 2015, which claims the benefit of U.S. Provisional Patent Application No. 62/032,179, filed Aug. 1, 2014, which are hereby incorporated by reference in its entirety.

TECHNICAL FIELD

The present disclosure is generally related to graphical simulations, and more particularly, to deformation of characters in graphical simulations.

BACKGROUND

Simulation video games are a category of video games generally designed to simulate aspects of a real or fictional reality as closely as possible. A "life simulation" is a sub category of simulation video games in which a player can control one or more virtual life forms (e.g., a simulated human character, an animal, etc.). The SIMS 3™, published by Electronic Arts Inc. of Redwood City, Calif., is an example of a life simulation video game. In The SIMS 3™, a player can create a character for a life simulation and configure its appearance by changing its body type, physical attributes, clothing, or accessories. A player may select from a predefined list of "parts" or "graphical assets" such as hair, hats, pants, shirts, boots, shoes, etc. The player can then assign one or more graphical assets to physical locations on the simulated character. If a player changes the physical appearance of the character by deforming different areas (e.g., making the hips wider, the shoulders broader, the body more muscular, etc.), any graphical asset that has been selected and assigned to that area of the character can be also be deformed accordingly. For example, if a user selects a tight fitting shirt for the character, then decides to broaden the shoulders, the shirt can be changed to conform to the changes to the shoulders of the character. Similarly, if a pair of pants is selected for a character, and the user widens the character's hips, the pants can be changed to conform to the wider hips.

To manage changes in shapes of graphical assets when simulated characters are modified, information should be maintained to control the parameters by which individual graphical assets may be modified. In particular, the maximum amount of deformation (the "delta") that may be applied to any particular graphical asset needs to be maintained (e.g., to control how far the hips may be widened, etc.) In The SIMS 3™, "blend shapes" are used to maintain the location of the vertices in the mesh of a graphical asset for both neutral (neutral mesh) and extreme outer limit deformations (delta mesh). The user interface would use the two blend shapes to determine the starting and ending point for any modifications/deformations of the character graphical assets in conformance with any modifications made by the user to the physical appearance of the character.

To manage changes in the texture of the surface of a simulated character, "displacement mapping" may also be used. This technique can use a texture or height map to cause an effect where the coordinate position of different points over a textured surface are displaced according to associated values stored in the map (e.g., occlusion, shadowing, silhouettes, etc.). For example, a displacement map may be used to apply wrinkles to a garment, or razor stubble to the face of a character. In some implementations, displacement mapping information may be saved in the form of an image.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for image-based deformation of simulated characters of varied topology in a video game. In some implementations, a player of a video game can create a character for a life simulation and configure its appearance by changing its body type, physical attributes, clothing, or accessories. The player may select from a predefined list of "parts" or "graphical assets" (meaning, a list of graphical assets that are included in the life simulation game that may be selected for a simulated character) such as hair, hats, pants, shirts, boots, shoes, etc. The player can then assign one or more graphical assets to physical locations on the simulated character. Subsequently, the player can modify the physical appearance of the character at the physical location where the graphical asset has been assigned by changing the character's shape (e.g., widening or narrowing the hips, shoulders, waist, etc.), which causes the graphical asset to be changed to conform with the modification to the character.

Simulation video games may manage changes to the shapes of graphical assets by saving all blend shapes associated with each asset that can be modified by the user. For each asset supported by a simulation video game, the neutral mesh and delta mesh must be stored for each part. In games that support a large number of assets, this can result in asset explosion, which requires a significant amount of storage for each asset. This, in turn, results in larger software packages that must be distributed to customers. Where software is distributed over the Internet, rather than by tangible media, this can have a significant impact on bandwidth. Moreover, the increased storage required to store the blend shapes can also result in significant increases in memory usage required to run the game. Displacement mapping may be used to manage changes in the texture of the surface of a simulated character, but is not applied to simulated characters with varying topology. Additionally, this technique is not typically used outside of high-end graphical simulations as it can require significant dedicated graphics processing resources.

Embodiments of the present disclosure transfer delta mesh value information to an image space and store it as RGB color values in a deformation map for the entire body of a simulated character. RGB (red, green, and blue) refers to a system for representing colors that may be displayed by a computer system. Red, green, and blue can be combined in various proportions to obtain any color in the visible spectrum. Levels of R, G, and B can each range from 0 to 100 percent of full intensity. Each level is represented by the range of decimal numbers from 0 to 255 (256 levels for each color). The delta information can then be applied to any graphical asset without requiring a specific delta-mesh for the individual asset. Additionally, embodiments of the present disclosure can be applied to simulated characters with varying topology by combining information stored in multiple deformation maps to a single graphical asset. Thus, each asset in a simulation that can be associated with a simulated character may have a different polygonal structure in comparison to all other graphical assets, but all assets can share a single deformation map. In an illustrative example, a character deformation system receives a graphical asset associated with a simulated character of a video game. A graphical asset can include a 3D geometry associated with a graphic rendering of an entire object. For example, a 3D geometry of a shoe, a boot, a "garment bottom" (e.g., a pair of pants, a skirt, etc.), a "garment top" (e.g., a shirt or blouse), a hat, hair, or any similar graphical object associated with a simulated character can be a graphical asset. In some implementations, the graphical asset may be received as a vertex buffer, which may be composed of an array of vertex data. The vertex data may include a vertex position, a normal vector, a deformation map (d-map) texture coordinate and a vertex color.

A simulated character is made up of polygons, which are in turn made up of individual vertices. A vertex position can be the coordinate position of one of the vertices of the simulated character. A normal vector is a 3-dimensional (e.g., x, y, and z coordinates) vector that represents the perpendicular direction from each vertex, which is used to apply lighting and shading effects to the surface of a character. A deformation map texture coordinate may be a location on the deformation map that corresponds to a 2-dimensional representation of the vertex position if the 3-dimensional simulated character were depicted in 2-dimensional space. If the simulated character is regarded as a 3-dimensional wireframe mesh that is analogous to the character's skin, the deformation map can be regarded as a depiction of the character's skin if it were unpeeled from the character's body and pressed flat on a 2-dimensional surface. Each 3-dimensional polygon vertex of the simulated character thus has a corresponding location on the 2-dimensional surface of a deformation map.

The vertex color indicates which deformation map topology to apply to the vertex. A topology may be a degree of deformation that can be applied to a simulated character based on how a graphical asset is displayed on the character in proximity to the character's skin (e.g., tight-fitting, loose-fitting, etc.). In some implementations, multiple topologies may be applied to a particular area of the body of a simulated character. For example, a single garment graphical asset can be tight-fitting in one area and loose-fitting in a neighboring area of the simulated character. On areas of the simulated character where a garment transitions from tight-fitting to loose-fitting, a combination of two deformation map values (one for tight-fitting and one for loose-fitting) may be applied. For example, where a skirt or dress stretches across the gap between a simulated character's legs. The garment may fit tightly against the legs, but depending on the body type, may drape differently when not in direct contact with the character's body. The vertex color can be used to determine the weight associated with each of the deformation map topologies (e.g., loose-fitting or tight-fitting).

The character deformation system can also receive a first deformation map (d-map) image and a second deformation map (d-map) image associated with the simulated character. The first image and second image may include graphical displacement mapping information for a first topology of image deformation and the second image may include graphical displacement mapping information for a second topology of deformation. For example, the first image may include graphical displacement mapping information for a topology representing assets that fit tightly to a simulated character's skin (e.g., skin-tight garments such as tights), and the second image may include graphical displacement mapping information for a topology representing assets that are loose-fitting (e.g., baggy pants, ruffled dress/skirt, puffy jacket). In some implementations, the character deformation system may deform the graphical asset in accordance with only one of the topologies. Alternatively, the character deformation system may deform the graphical asset using a combination of the two topologies (e.g. a garment that is tight fitting in one location and loose fitting in an adjacent location). The graphical displacement mapping information in each image may include the maximum amount of displacement in 3-dimensional space that can be applied to any particular portion of a graphical asset (the "delta") when deformed by the character deformation system.

In some implementations, the character deformation system can receive a third deformation map (d-map) image and a fourth deformation map (d-map) image associated with the simulated character. The third image and fourth image may include graphical displacement mapping information for the first topology of image deformation noted above and the fourth image may include graphical displacement mapping information for the second topology of deformation noted above. The third and fourth images may include graphical displacement mapping information that can be applied to the normal vectors received in the vertex buffer to generate lighting or shading effects consistent with the deformation applied to the graphical asset using the first and second deformation map images.

The character deformation system can then deform a portion of the graphical asset using the graphical displacement mapping information from the first image and the second image to change the 3D geometry of the portion of the graphical asset. The character deformation system may deform the graphical asset by calculating new 3-dimensional position coordinates for all vertices received in the vertex buffer. Additionally, the character deformation system may calculate new 3-dimentional direction coordinates for all normal vectors received in the vertex buffer using the graphical displacement mapping information from the third image and the fourth image to apply lighting or shading effects to the deformed graphical asset. The degree of deformation to apply to the portion of the graphical asset may be controlled via input from an input device. In some implementations, a user may use an input device (e.g., a mouse) to click on a particular portion of the graphical asset and drag the cursor to expand the portion of the graphical asset in different directions. For example, a user may click on the hip of a simulated character and drag the cursor left or right to widen the hip area of the character. Alternatively, a user may use a slider control presented on the screen to manipulate pre-set body style characteristics (e.g., lean, heavy, fit, pregnant, etc.), which may then be applied to the graphical assets associated with the simulated character.

In an illustrative example, the character deformation system may calculate new maximum deformation (delta-mesh) position coordinates for the graphical asset by first determining a location of the appropriate pixels in the deformation maps (the pixel location) that will be used to store the displacement mapping information for the vertex of the simulated character. The pixel location may be computed by determining the 2-dimensional coordinates (x, y coordinates) of the vertex in the character mesh if the skin of the character were unpeeled from the body and pressed flat in 2-dimensional space. In some implementations, the 2-dimensional coordinate can be the deformation map texture coordinate received in the array of vertex data. The pixel location can be located at the corresponding 2-dimensional coordinate of the displacement map image for each displacement map. Assuming two deformation map images are used (one for tight-fitting and another for loose-fitting topologies), the same pixel location may be used to refer to both deformation maps.

Once the pixel location has been computed, the character deformation system may then identify a color value that is located at the pixel location for each of the first and second deformation map images. The color values may each be composed of a numerical color channel triplet (e.g. an RGB numerical value) that corresponds to a coordinate in 3-dimensional geometry space. The red channel (R) may represent the x-axis (horizontal) coordinate, the green channel (G) may represent the y-axis (vertical) coordinate, and the blue channel (B) may represent the z-axis. In some implementations, the coordinate can represent the maximum deformation change (e.g., the deformation delta) that may be applied to the vertex of a simulated character that corresponds to the coordinate in the deformation map at the pixel location. For example, the most extreme deformation that can be achieved can be stored as the highest available value in the channel (e.g., 255), which will provide the largest delta.

The character deformation system may then calculate a total displacement value for the portion of the graphical asset that is to be deformed using the color values identified in the first and second images. As noted above, the character deformation system may deform a graphical asset for a single topology or a combination of two topologies. In the case of a combination, the character deformation system may first determine weight values to be applied to each of the two deformation maps. For example, a graphical asset that is partly skin-tight and partly loose-fitting may require the application of both deformation maps in different proportions (e.g. 40% skin-tight and 60% loose-fitting). The character deformation system may determine the weight values for each of the deformation maps by using information received in the vertex buffer, such as a vertex color, a numerical value, a Boolean flag, or the like.

In some implementations, the character deformation system can receive a vertex color in the vertex buffer that is associated with the vertex to be deformed, and examine a particular channel of the color received (e.g., the R, G, or B channels of an RGB formatted color). For example, the red (R) channel of the vertex color may be examined to obtain the value stored in the channel. If the red channel stores a higher value (indicating a color that is "more red"), this can indicate a higher weight is assigned to the loose-fitting deformation map. Conversely, if the channel stores a lower value (indicating a color that is "less red"), this can indicate a lower weight is assigned to the loose-fitting deformation map and a higher weight is assigned to the skin-tight deformation map. Values at the most extreme end of the color channel can indicate that only a single deformation map may be used (e.g., a value of 100 could indicate that only the loose-fitting d-map may be used, and a value of 0 could indicate that only the tight-fitting d-map may be used).

Subsequently, the character deformation system can calculate a displacement value for the first topology using the color value from the first displacement map image and its associated weight value. If a second topology is involved in the deformation, the character deformation system can calculate a second displacement value for the second topology using the color value from the second displacement map image and its associated weight value. In some implementations a skin-tight displacement may be calculated by taking the 3-dimensional coordinate from the RGB triplet stored as a color in the skin-tight displacement map image and multiplying it by a scalar constant value. Additionally, a loose-fitting displacement may be calculated by taking the 3-dimensional coordinate from the RGB triplet stored as a color in the loose-fitting displacement map image and multiplying it by a scalar constant value. The two displacement values may then each be modified in view of the weight values calculated from the vertex color. The weighted displacement values may then be combined to obtain a total displacement value for the vertex to be deformed.

The character deformation system may repeat the process described above to calculate new 3-dimentional direction coordinates for all normal vectors received in the vertex buffer using the graphical displacement mapping information from the third image and the fourth image to apply lighting or shading effects consistent with the deformation applied to the graphical asset using the first and second deformation map images. The character deformation system can identify the color value that is located at the same pixel location computed above for each of the third and fourth deformation map images and calculate a total displacement for the normal vector using the same weight values used with the first and second deformation maps.

In some implementations, the total displacement may be further modified by receiving user input from an input device to further deform the portion of the graphical asset. The user input may be received by a slider control, clicking and dragging directly on the simulated character, selecting a deformation option from a list, or in any similar manner. Once the total displacement value has been determined, the character deformation system may then update the portion of the graphical asset to be deformed using the total displacement value. In some implementations, the total displacement value may be added to the vertex position of the vertex data received in the vertex buffer, and then the modified vertex position may be written back to the vertex buffer to be rendered on the simulated character.

Embodiments of the present disclosure are thus capable of transferring delta mesh value information to an image space, storing it as RGB color values for the entire body of a simulated character, and applied to any graphical asset without requiring specific delta-mesh for the individual asset. Utilizing deformation map information for the entire body of a character reduces required storage space by eliminating the need to store delta-mesh information for each individual part. This can additionally reduce the memory required to support a simulation application, which in turn allows the application to be run on computer systems with limited available memory and processor resources. Further, since the deformation map information is maintained apart from individual graphical assets, new assets can be added to the simulation environment without requiring modification to the deformation map. Similarly, modifications to the types of deformations that may be made to the simulated character may be maintained without the need to modify all graphical assets in the graphical simulation application.

Figure 1A:
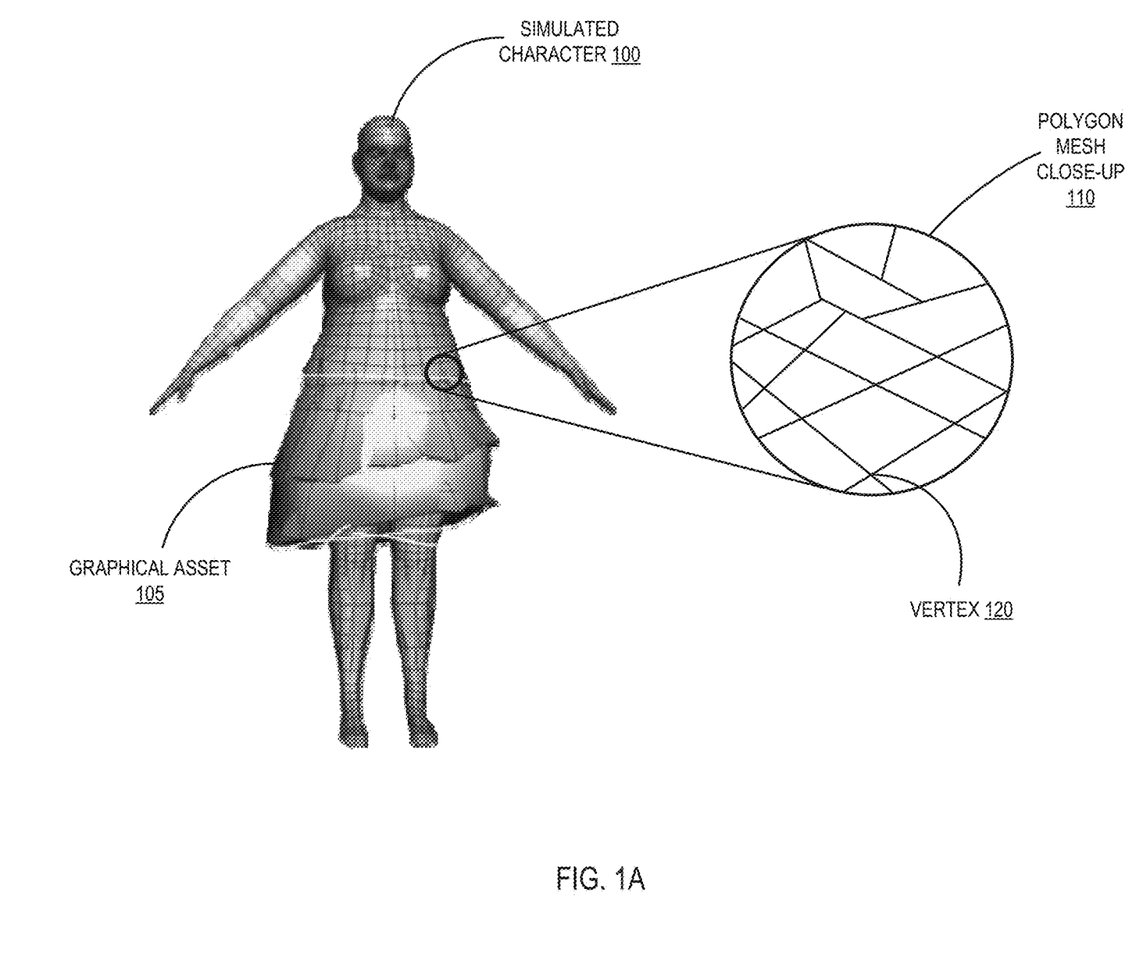
FIG. 1A illustrates an example of a simulated character, in accordance with one or more embodiments of the present disclosure.
Figure 1B:
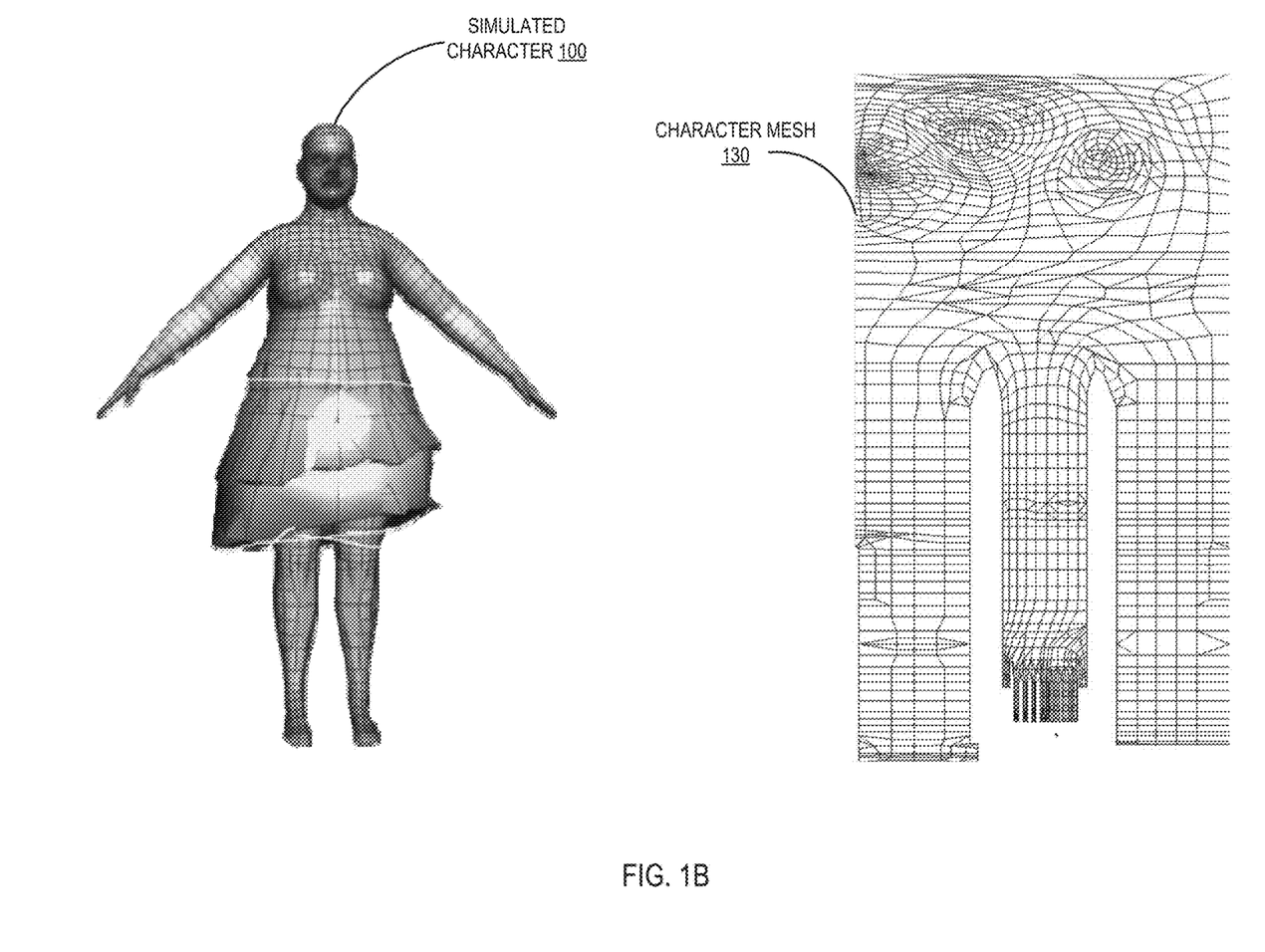
FIG. 1B illustrates an example of a wireframe mesh associated with a simulated character, in accordance with one or more embodiments of the present disclosure.
Figure 1C:
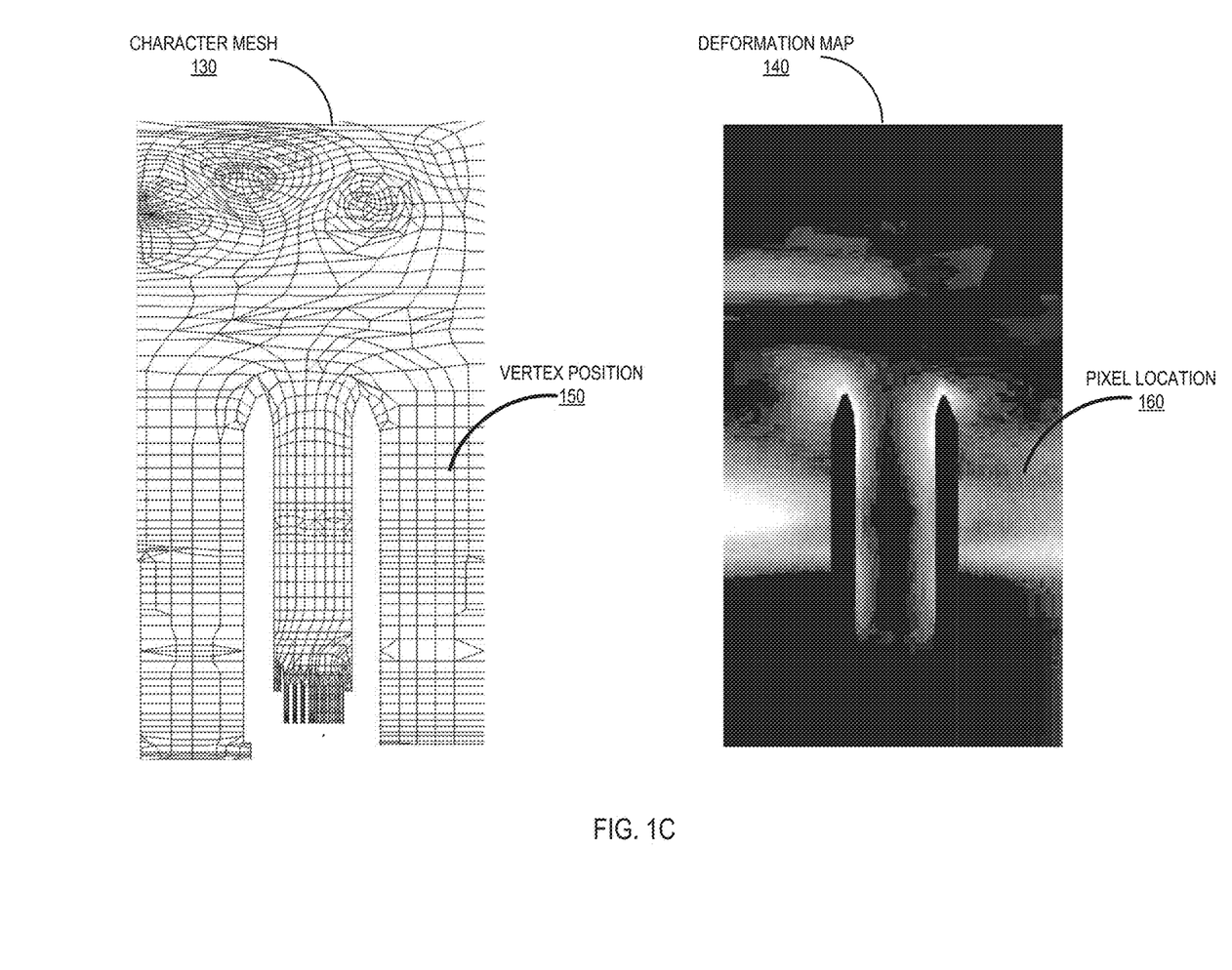
FIG. 1C illustrates an example of a wireframe mesh associated with a simulated character and a corresponding deformation map image, in accordance with one or more embodiments of the present disclosure.

FIGS. 1A-1C illustrate an example of a simulated character with an associated deformation map. FIG. 1A illustrates an example of a simulated character. Simulated character 100 is shown as a wireframe mesh that is made up of polygons. Simulated character 100 has been assigned graphical asset 105, which in FIG. 1A is a skirt. Although graphical asset 105 is depicted as a particular type of asset, it will be appreciated by one of ordinary skill in the art that graphical asset 105 can be any type of asset available that may be assigned to a simulated character. Polygon mesh close-up 110 shows a zoomed-in representation of the wireframe mesh of simulated character 100, illustrating the intersections of several polygons that make up the mesh of simulated character 100. The intersections of the polygons in polygon mesh close-up 110 illustrate various vertices that are a part of the simulated character 100. Vertex 120 is one of the vertices in polygon mesh close-up 110. As noted above, vertex 120 may be associated with a vertex position value, a d-map texture coordinate, and a vertex color.

FIG. 1B illustrates an example of a wireframe mesh associated with a simulated character. Character mesh 130 is a 2-dimensional representation of the vertex positions of simulated character 100. If the 3-dimensional wireframe mesh of simulated character 100 were unpeeled from the character's body and pressed flat on a 2-dimensional surface, character mesh 130 would be the result.

FIG. 1C illustrates an example of a wireframe mesh associated with a simulated character and a corresponding deformation map image. Each vertex position 150 from character mesh 130 can have a corresponding pixel location 160 in deformation map 140. As noted above, each vertex position 150 may include a deformation map texture coordinate, which represents a 2-dimensional coordinate that can be used to identify pixel location 160 in deformation map 140. The color value at pixel location 160 can be composed of a numerical color channel triplet (e.g. an RGB numerical value) that corresponds to a coordinate in 3-dimensional geometry space. The red channel (R) may represent the x-axis (horizontal) coordinate, the green channel (G) may represent the y-axis (vertical) coordinate, and the blue channel (B) may represent the z-axis. As noted above, the coordinate can represent the maximum deformation change (e.g., the deformation delta) that may be applied to the vertex of a simulated character that corresponds to the coordinate in the deformation map at the pixel location. In some implementations, the coordinate may represent the maximum deformation change that may be applied to the normal vector of the simulated character that corresponds to the coordinate in the deformation map at the pixel location.

It should be noted that while FIGS. 1A-1C illustrate a particular simulated character, one of ordinary skill in the art would appreciate that the described embodiments of the present disclosure are not limited only to this character, and thus may be applied to different types of simulated characters. Additionally, while only a single deformation map image is depicted, one of ordinary skill in the art will appreciate that the described embodiments of the present disclosure may be applied to deformation maps of different topologies.

Figure 2:
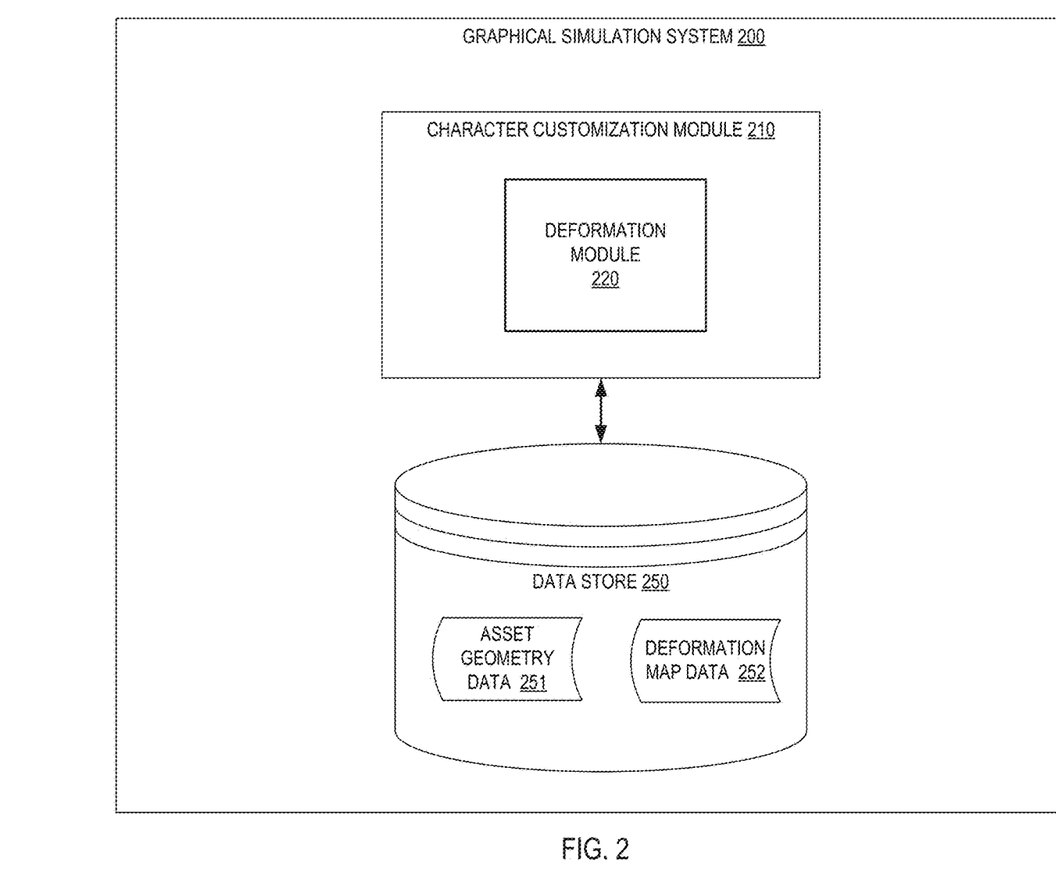
FIG. 2 depicts a high-level component diagram of an example graphical simulation system architecture, in accordance with one or more embodiments of the present disclosure.

FIG. 2 depicts a high-level component diagram of an illustrative example of a graphical simulation system 200, in accordance with one or more embodiments of the present disclosure. One skilled in the art will appreciate that other architectures for graphical simulation system 200 are possible, and that the implementation of a computer system utilizing examples of the invention are not necessarily limited to the specific architecture depicted by FIG. 2.

As shown in FIG. 2, the graphical simulation system 200 may include a character customization module 210 and a data store 250 (e.g., one or more magnetic hard disk drives, a Universal Serial Bus [USB] solid state drive, a Redundant Array of Independent Disks [RAID] system, a network attached storage [NAS] array, etc.). The graphical simulation system 200 may be a server, a mainframe, a workstation, a personal computer (PC), a mobile phone, a palm-sized computing device, etc. Graphical simulation system can generate and maintain simulated characters for use in a video game. For example, graphical simulation system can be accessed by a user via a graphical user interface to create a simulated character for use in a video game. Alternatively, graphical simulation system may be used as a runtime component of a video game, providing real time modifications to simulated characters during execution of the video game (meaning, graphical conflicts between assets associated with a simulated character may be resolved as they occur during the execution of the simulation video game).

Character customization module 210 can manage customization of graphical assets associated with a simulated character. In certain implementations, character customization module 210 may be invoked by a graphical user interface to select graphical assets for particular physical locations of a simulated character. For example, a user interface may permit a user to select a skirt asset to associate with a simulated character's lower body.

Character customization module may additionally include deformation module 220 that can deform graphical assets of varied topology, as described in detail below with respect to FIGS. 3-5. It should be noted that in some alternative implementations, deformation module 220 may be external to character customization module 210, rather than embedded within character customization module 210, or may replace character customization module 210.

Data store 250 can store information related to graphical assets that may be used to build a simulated character for a video game. Data store 250 may include asset geometry data 251, which can store the geometry data for each graphical asset available in graphical simulation system 200 (e.g., the shape, color, and appearance of each asset, etc.). Data store 250 may additionally include deformation map data 252, which can store the deformation map images for simulated characters. Information from data store 250 can be accessed by deformation module 220 to deform graphical assets associated with a simulated character, as described in detail below with respect to FIGS. 3-5.

Figure 3:
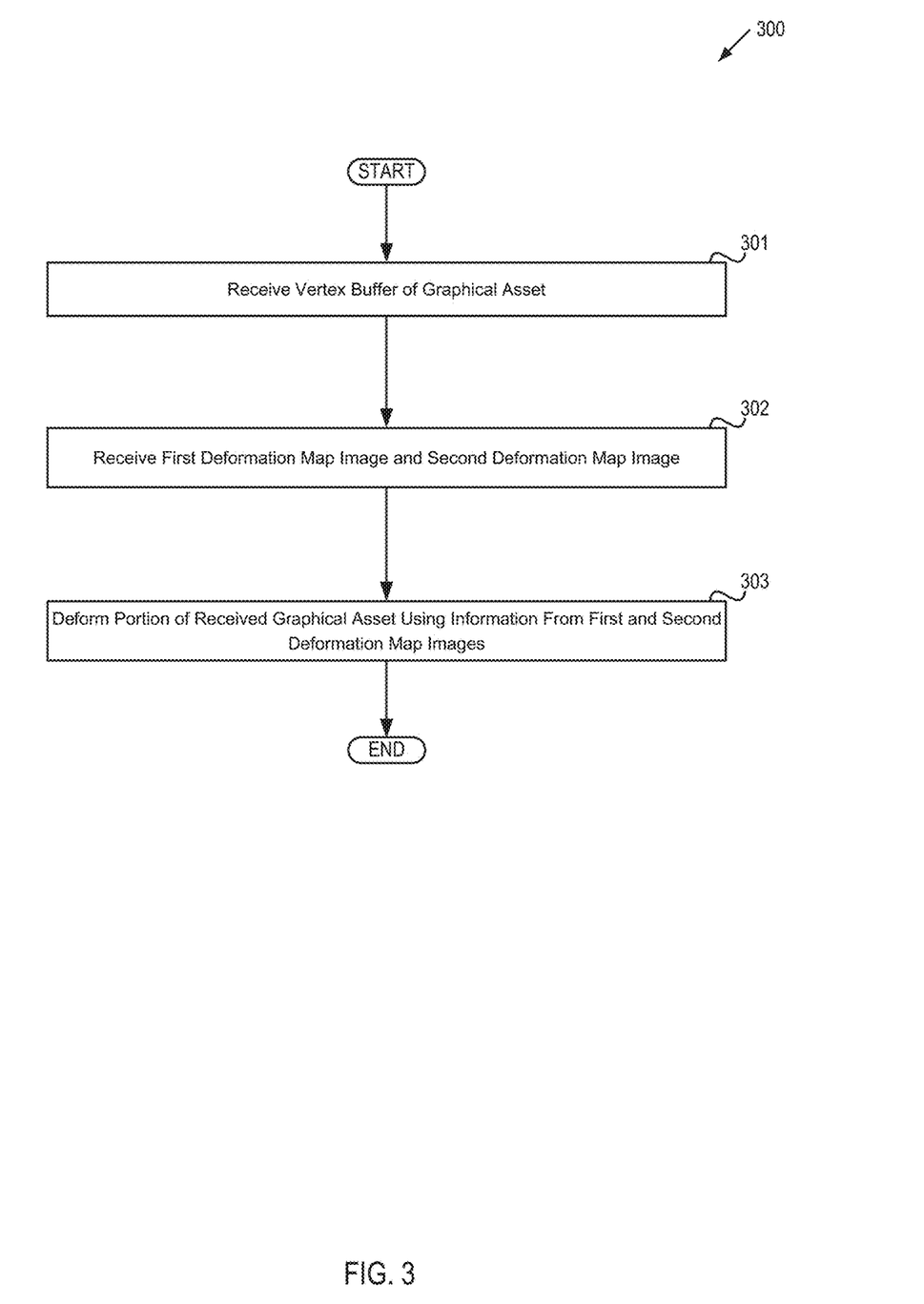
FIG. 3 depicts a flow diagram of a method for image-based deformation of a simulated character, in accordance with one or more embodiments of the present disclosure.

FIG. 3 depicts a flow diagram of an example method 300 for image-based deformation of a simulated character. The method may be performed by processing logic that may comprise hardware (circuitry, dedicated logic, etc.), software (such as is run on a general purpose computer system or a dedicated machine), or a combination of both. In one illustrative example, method 300 may be performed by deformation module 220 in FIG. 2. Alternatively, some or all of method 300 might be performed by another module or machine. It should be noted that blocks depicted in FIG. 3 could be performed simultaneously (at least partially overlapping in time) or in a different order than that depicted.

At block 301, processing logic receives a graphical asset associated with a simulated character of a video game. A graphical asset can include a 3D geometry associated with a graphic rendering of an entire object. For example, a 3D geometry of a shoe, a boot, a "garment bottom" (e.g., a pair of pants), a "garment top" (e.g., a shirt or blouse), a hat, hair, or any similar graphical object associated with a simulated character can be a graphical asset. In some implementations, the graphical asset may be received as a vertex buffer, which may be composed of an array of vertex data. The vertex data may include a vertex position, a normal vector, a deformation map (d-map) texture coordinate and a vertex color.

At block 302, processing logic receives a first deformation map (d-map) image and second deformation map image associated with the simulated character. The first image and second image may include graphical displacement mapping information for a first topology of image deformation and the second image comprising graphical displacement mapping information for a second topology of deformation. For example, the first image may include graphical displacement mapping information for a topology representing assets that fit tightly to a simulated character's skin (e.g., skin-tight garments such as tights), and the second image may include graphical displacement mapping information for a topology representing assets that are loose-fitting (e.g., baggy pants, ruffled dress/skirt, puffy jacket).

In some implementations, the character deformation system may also receive a third deformation map (d-map) image and a fourth deformation map (d-map) image associated with the simulated character. The third image and fourth image may include graphical displacement mapping information for the first topology of image deformation noted above and the fourth image may include graphical displacement mapping information for the second topology of deformation noted above. The third and fourth images may include graphical displacement mapping information that can be applied to the normal vectors received in the vertex buffer to generate lighting or shading effects consistent with the deformation applied to the graphical asset using the first and second deformation map images.

At block 303, processing logic deforms a portion of the graphical asset using the graphical displacement mapping information from the first image and the second image to change the 3D geometry of the portion of the graphical asset. The character deformation system may deform the graphical asset by calculating new 3-dimensional position coordinates for all vertices received in the vertex buffer. Additionally, the character deformation system may calculate new 3-dimensional position coordinates for all normal vectors received in the vertex buffer using the graphical displacement mapping information from the third image and the fourth image to apply lighting or shading effects to the deformed graphical asset. In one illustrative example, processing logic may deform the portion of the graphical asset as described in further detail below with respect to FIGS. 4-5. The degree of deformation to apply to the portion of the graphical asset may be controlled via input from an input device. In some implementations, a user may use an input device (e.g., a mouse) to click on a particular portion of the graphical asset and drag the cursor to expand the portion of the graphical asset in different directions. For example, a user may click on the hip of a simulated character and drag the cursor left or right to widen the hip area of the character. Alternatively, a user may use a slider control presented on the screen to manipulate pre-set body style characteristics (e.g., lean, heavy, fit, pregnant, etc.), which may then be applied to the graphical assets associated with the simulated character.

After block 303, the method of FIG. 3 terminates.

Figure 4:
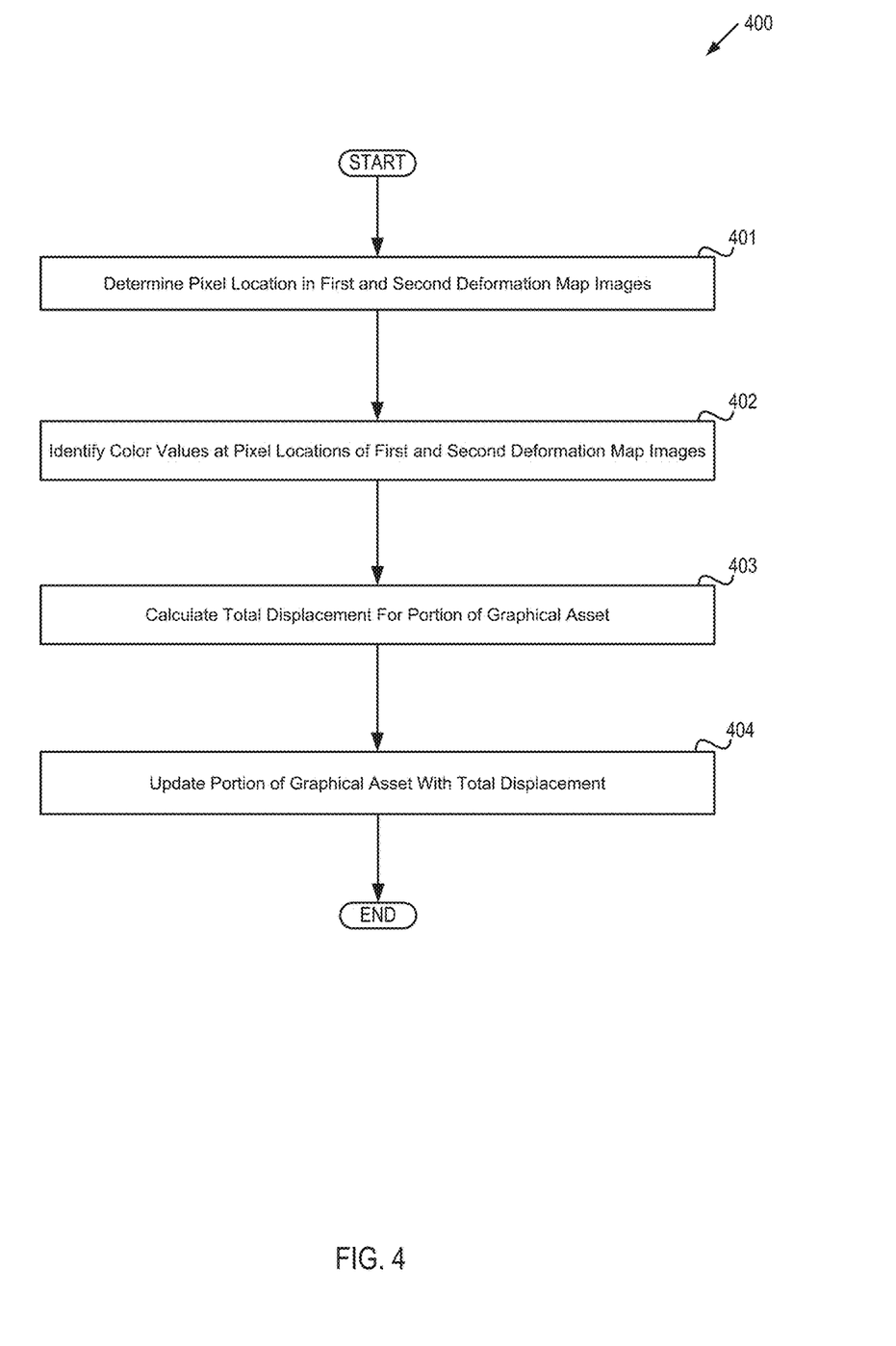
FIG. 4 depicts a flow diagram of a method for deforming a portion of a graphical asset associated with a simulated character, in accordance with one or more embodiments of the present disclosure.

FIG. 4 depicts a flow diagram of a method 400 for deforming a portion of a graphical asset associated with a simulated character. The method may be performed by processing logic that may comprise hardware (circuitry, dedicated logic, etc.), software (such as is run on a general purpose computer system or a dedicated machine), or a combination of both. In one illustrative example, method 400 may be performed by deformation module 220 in FIG. 2. Alternatively, some or all of method 400 might be performed by another module or machine. It should be noted that blocks depicted in FIG. 4 could be performed simultaneously (at least partially overlapping in time) or in a different order than that depicted.

At block 401, processing logic determines a pixel location in the first and second deformation map images. The pixel location may be computed by determining the 2-dimensional coordinates (x, y coordinates) of the vertex in the character mesh if the skin of the character were unpeeled from the body and pressed flat in 2-dimensional space. In some implementations, the 2-dimensional coordinate can be the deformation map texture coordinate received in the array of vertex data. The pixel location can be located at the corresponding 2-dimensional coordinate of the displacement map image for each displacement map. Assuming two deformation map images are used (one for tight-fitting and another for loose-fitting topologies), the same pixel location may be used to refer to both deformation maps. In some implementations, processing logic may additionally determine the corresponding pixel locations for the third and fourth images.

At block 402, processing logic identifies color values at the pixel locations of the first and second deformation map images. The color values may each be composed of a numerical color channel triplet (e.g. an RGB numerical value) that corresponds to a coordinate in 3-dimensional geometry space. The red channel (R) may represent the x-axis (horizontal) coordinate, the green channel (G) may represent the y-axis (vertical) coordinate, and the blue channel (B) may represent the z-axis. In some implementations, the coordinate can represent the maximum deformation change (e.g., the deformation delta) that may be applied to the vertex of a simulated character that corresponds to the coordinate in the deformation map at the pixel location. For example, the most extreme deformation that can be achieved can be stored as the highest available value in the channel (e.g., 255), which will provide the largest delta. Processing logic may additionally identify the color value that is located at the same pixel location for each of the third and fourth deformation map images which can represent the maximum deformation change that may be applied to the normal vectors received in the vertex buffer to generate lighting or shading effects consistent with the deformation applied to the graphical asset using the first and second deformation map images.

At block 403, processing logic calculates a total displacement for the portion of the graphical asset that is to be deformed using the color values identified at block 402. In one illustrative example, processing logic may calculate the total displacement as described in further detail below with respect to FIG. 5.

At block 404, processing logic updates the portion of the graphical asset with the total displacement. In some implementations, the total displacement value may be added to the vertex position of the vertex data received in the vertex buffer, and then the modified vertex position may be written back to the vertex buffer to be rendered on the simulated character. Additionally, the total displacement value may be added to the normal vector of the vertex data received in the vertex buffer, and then the modified normal vector may be written back to the vertex buffer to be rendered on the simulated character. After block 404, the method of FIG. 4 terminates.

Figure 5:
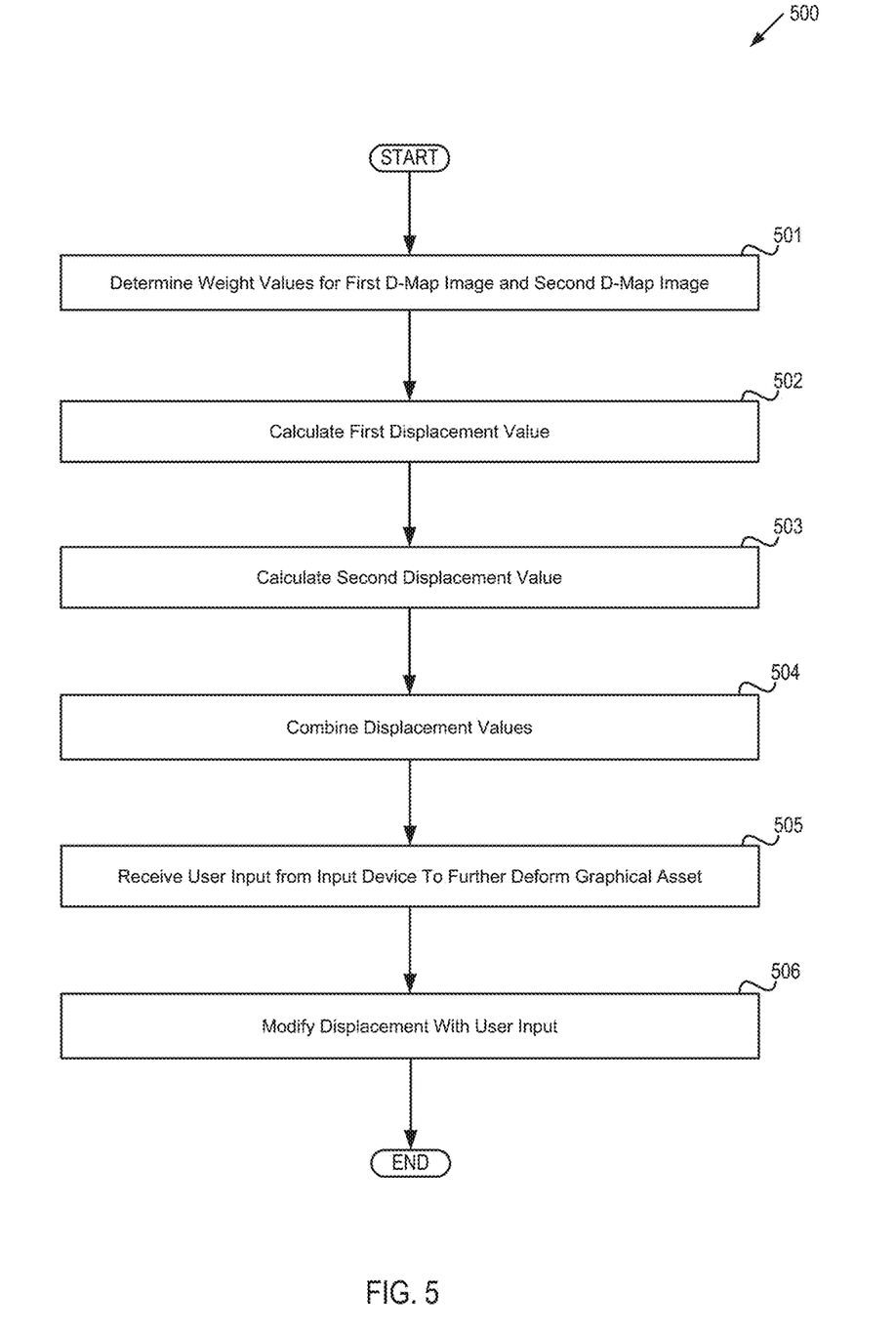
FIG. 5 depicts a flow diagram of a method for calculating total displacement for deforming a portion of a graphical asset, in accordance with one or more embodiments of the present disclosure.

FIG. 5 depicts a flow diagram of a method 500 for calculating total displacement for deforming a portion of a graphical asset. The method may be performed by processing logic that may comprise hardware (circuitry, dedicated logic, etc.), software (such as is run on a general purpose computer system or a dedicated machine), or a combination of both. In one illustrative example, method 500 may be performed by deformation module 220 in FIG. 2. Alternatively, some or all of method 500 might be performed by another module or machine. It should be noted that blocks depicted in FIG. 5 could be performed simultaneously (at least partially overlapping in time) or in a different order than that depicted. The method may be performed to calculate total displacement for vertex position information to deform a graphical asset or to calculate total displacement for normal vector information to apply lighting or shading effects to the deformed graphical asset.

At block 501, processing logic determines weight values for the first deformation map image and second deformation map image. Processing logic may determine the weight values for each of the deformation maps by using information received in the vertex buffer, such as a vertex color, a numerical value, a Boolean flag, or the like. In some implementations, processing logic can receive a vertex color in the vertex buffer that is associated with the vertex to be deformed, and examine a particular channel of the color received (e.g., the R, G, or B channels of an RGB formatted color). If the red channel stores a higher value (indicating a color that is "more red"), this can indicate a higher weight is assigned to the loose-fitting deformation map. Conversely, if the channel stores a lower value (indicating a color that is "less red"), this can indicate a lower weight is assigned to the loose-fitting deformation map and a higher weight is assigned to the skin-tight deformation map.

At block 502, processing logic calculates a first displacement value using the first color value and the first weight value. The first displacement may be calculated by taking the 3-dimensional coordinate from the RGB triplet stored as a color in the first deformation map image and multiplying it by a scalar constant value.

At block 503, processing logic calculates a second displacement value using the second color value and the second weight value. The second displacement may be calculated by taking the 3-dimensional coordinate from the RGB triplet stored as a color in the second deformation map image and multiplying it by a scalar constant value.

At block 504, processing logic combines the first and second displacement values to calculate a total displacement value. At block 505, processing logic can receive user input from an input device to further deform the portion of the graphical asset. For example, the user input may be received by a slider control on a graphical user interface, by a user clicking and dragging with a mouse directly on the simulated character, by selecting a deformation option from a list, or in any similar manner.

At block 506, processing logic can modify the combined displacement from block 504 with the user input received at block 505. In some implementations, the total displacement value may be added to the vertex position of the vertex data received in the vertex buffer, and then the modified vertex position may be written back to the vertex buffer to be rendered on the simulated character. After block 506, the method of FIG. 5 terminates.

Figure 6:
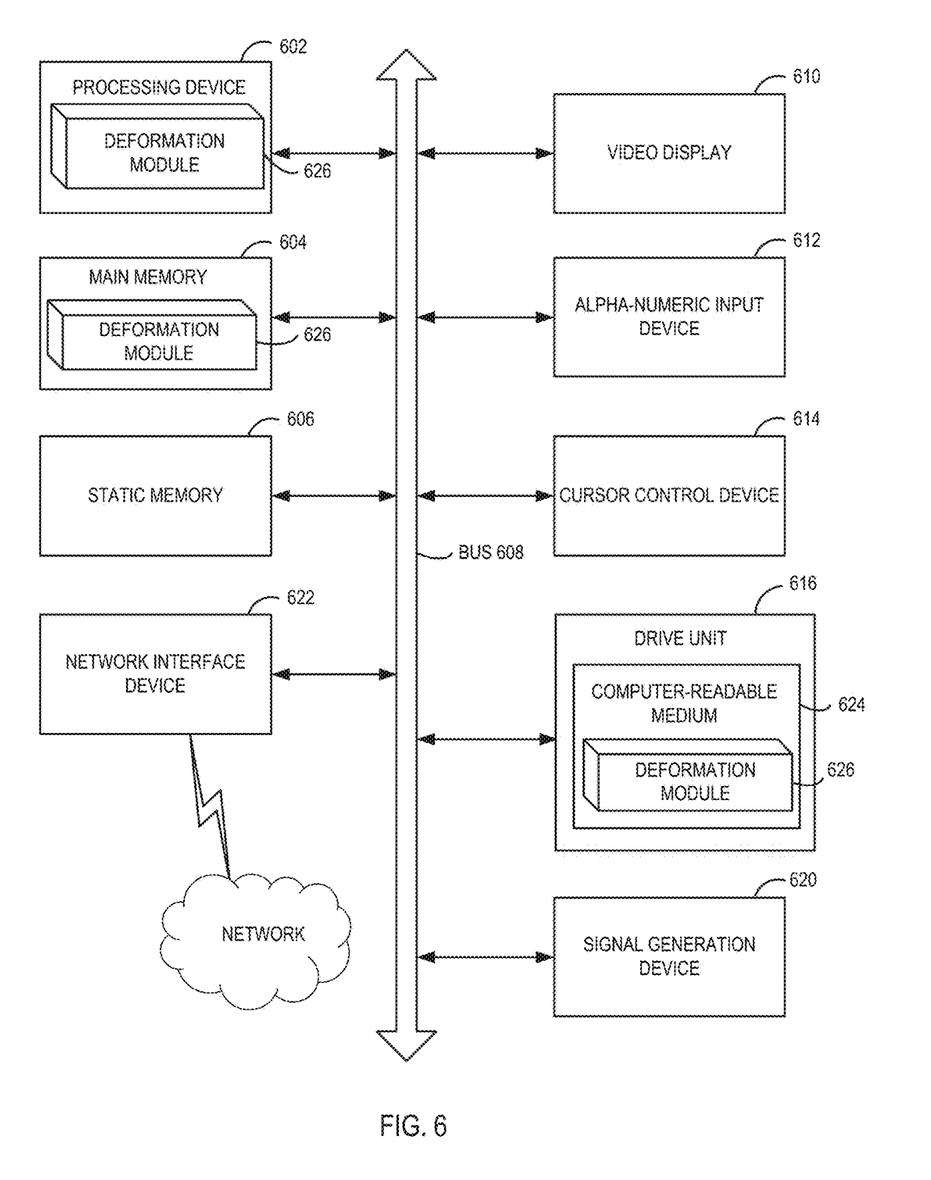
FIG. 6 depicts a block diagram of an illustrative computer system operating in accordance with examples of the invention.

FIG. 6 depicts an example computer system 600 which can perform any one or more of the methods described herein. In one example, computer system 600 may correspond to graphical simulation system 200 of FIG. 2. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit (CPU), graphical processing unit (GPU), or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute deformation module 626 for performing the operations and steps discussed herein (e.g., corresponding to the methods of FIGS. 3-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable medium 624 on which is stored deformation module 626 (e.g., corresponding to the methods of FIGS. 3-5, etc.) embodying any one or more of the methodologies or functions described herein. Deformation module 626 may also reside, completely or at least partially, within the main memory 604 and/or within the processing device 602 during execution thereof by the computer system 600, the main memory 604 and the processing device 602 also constituting computer-readable media. Deformation module 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled. Particularly, while embodiments of the present disclosure have been described above as applying to polygonal models, these embodiments can also be applied in a similar manner to other three dimensional surface representation structures such as nurbs, splines, subdivision surfaces, etc.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "deforming," "identifying," "calculating," "combining," "modifying," "adding," "writing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device, a graphical asset associated with a simulated character of a video game, wherein the graphical asset comprises a vertex buffer, the vertex buffer comprising an array of vertex data, wherein the vertex data comprises a vertex position, a normal vector, a deformation map texture coordinate and a vertex color;
   receiving, by the processing device, a first image and a second image associated with the simulated character, the first image comprising graphical displacement mapping information for a first topology of image deformation for the simulated character and the second image comprising graphical displacement mapping information for a second topology of deformation for the simulated character, wherein the graphical displacement mapping information comprises a maximum displacement in three-dimensional (3D) space that may be applied to a portion of the graphical asset;
   determining a pixel location in the first image and the second image in view of the deformation map texture coordinate of the vertex data;
   identifying a first color value at the pixel location of the first image and a second color value at the pixel location of the second image;
   calculating a total displacement value for the portion of the graphical asset in view of the first color and the second color; and
   deforming, by the processing device, the portion of the graphical asset by updating the portion of the graphical asset in view of the total displacement value to change a 3D geometry of the portion of the graphical asset.

2. The method of claim 1, wherein calculating the total displacement value comprises:
   determining a first weight value of the first image and a second weight value of the second image;
   calculating a first displacement value;
   calculating a second displacement value; and
   combining the first displacement value and the second displacement value.

3. The method of claim 2, further comprising:
   receiving user input from an input device to further deform the portion of the graphical asset; and
   modifying the total displacement value in view of the user input.

4. The method of claim 1, wherein updating the portion of the graphical asset comprises:
   adding the total displacement value to the vertex position of the vertex data; and
   writing the modified vertex position back to the vertex buffer.

5. The method of claim 1, wherein each of the first color value and the second color value comprise a numerical color channel triplet, the triplet corresponding to a coordinate in 3D geometry space.

6. The method of claim 1, wherein the graphical asset comprises a 3D geometry associated with a graphic rendering of an entire object.

7. The method of claim 6, wherein the object comprises at least one of the 3D geometry of a portion of the body of the simulated character, a shoe, a boot, a garment bottom, a garment top, a hat, or hair.

8. The method of claim 1, further comprising:
   receiving a third image and a fourth image associated with the simulated character, the third image comprising graphical displacement mapping information for the first topology of image deformation and the fourth image comprising graphical displacement mapping information for the second topology of deformation; and
   modifying the normal vector of the graphical asset using the graphical displacement mapping information from the third image and the fourth image to change the 3D geometry of the portion of the graphical asset.

9. An apparatus, comprising:
   a memory to store instructions; and
   a processing device, operatively coupled to the memory, to execute the instructions, wherein the processing device is to:
      receive a graphical asset associated with a simulated character of a video game, wherein the graphical asset comprises a vertex buffer, the vertex buffer comprising an array of vertex data, wherein the vertex data comprises a vertex position, a normal vector, a deformation map texture coordinate and a vertex color;
      receive a first image and a second image associated with the simulated character, the first image comprising graphical displacement mapping information for a first topology of image deformation for the simulated character and the second image comprising graphical displacement mapping information for a second topology of deformation for the simulated character, wherein the graphical displacement mapping information comprises a maximum displacement in three-dimensional (3D) space that may be applied to a portion of the graphical asset;
      determine a pixel location in the first image and the second image in view of the deformation map texture coordinate of the vertex data;
      identify a first color value at the pixel location of the first image and a second color value at the pixel location of the second image;
      calculate a total displacement value for the portion of the graphical asset in view of the first color and the second color; and
      deform the portion of the graphical asset by updating the portion of the graphical asset in view of the total displacement value to change a 3D geometry of the portion of the graphical asset.

10. The apparatus of claim 9, wherein to calculate the total displacement value, the processing device is to:
    determine a first weight value of the first image and a second weight value of the second image;
    calculate a first displacement value;
    calculate a second displacement value; and
    combine the first displacement value and the second displacement value.

11. The apparatus of claim 10, wherein the processing device is further to:
- receive user input from an input device to further deform the portion of the graphical asset; and
- modify the total displacement value in view of the user input.

12. The apparatus of claim 9, wherein to update the portion of the graphical asset, the processing device is to:
- add the total displacement value to the vertex position of the vertex data; and
- write the modified vertex position back to the vertex buffer.

13. The apparatus of claim 9, wherein each of the first color value and the second color value comprise a numerical color channel triplet, the triplet corresponding to a coordinate in 3D geometry space.

14. The apparatus of claim 9, wherein the processing device is further to:
- receiving a third image and a fourth image associated with the simulated character, the third image comprising graphical displacement mapping information for the first topology of image deformation and the fourth image comprising graphical displacement mapping information for the second topology of deformation; and
- modifying the normal vector of the graphical asset using the graphical displacement mapping information from the third image and the fourth image to change the 3D geometry of the portion of the graphical asset.

15. A non-transitory computer readable storage medium, having instructions stored therein, which when executed by a processing device, cause the processing device to:
- receive, by the processing device, a graphical asset associated with a simulated character of a video game, wherein the graphical asset comprises a vertex buffer, the vertex buffer comprising an array of vertex data, wherein the vertex data comprises a vertex position, a normal vector, a deformation map texture coordinate and a vertex color;
- receive, by the processing device, a first image and a second image associated with the simulated character, the first image comprising graphical displacement mapping information for a first topology of image deformation for the simulated character and the second image comprising graphical displacement mapping information for a second topology of deformation for the simulated character, wherein the graphical displacement mapping information comprises a maximum displacement in three-dimensional (3D) space that may be applied to a portion of the graphical asset;
- determine a pixel location in the first image and the second image in view of the deformation map texture coordinate of the vertex data;
- identify a first color value at the pixel location of the first image and a second color value at the pixel location of the second image;
- calculate a total displacement value for the portion of the graphical asset in view of the first color and the second color; and
- deform, by the processing device, the portion of the graphical asset by updating the portion of the graphical asset in view of the total displacement value to change a 3D geometry of the portion of the graphical asset.

16. The non-transitory computer readable storage medium of claim 15, wherein to update the portion of the graphical asset, the processing device is to:
- add the total displacement value to the vertex position of the vertex data; and
- write the modified vertex position back to the vertex buffer.

17. The non-transitory computer readable storage medium of claim 16, wherein to calculate the total displacement value, the processing device is to:
- determine a first weight value of the first image and a second weight value of the second image;
- calculate a first displacement value;
- calculate a second displacement value; and
- combine the first displacement value and the second displacement value.

18. The non-transitory computer readable storage medium of claim 16, further comprising executable instructions to cause the processing device to:
- receive user input from an input device to further deform the portion of the graphical asset; and
- modify the total displacement value in view of the user input.

19. The non-transitory computer readable storage medium of claim 15, wherein the processing device is further to:
- receive, by the processing device, a third image and a fourth image associated with the simulated character, the third image comprising graphical displacement mapping information for the first topology of image deformation and the fourth image comprising graphical displacement mapping information for the second topology of deformation; and
- modify, by the processing device, the normal vector of the graphical asset using the graphical displacement mapping information from the third image and the fourth image to change the 3D geometry of the portion of the graphical asset.

20. The non-transitory computer readable storage medium of claim 15, wherein each of the first color value and the second color value comprise a numerical color channel triplet, the triplet corresponding to a coordinate in 3D geometry space.

* * * * *